United States Patent [19]

Gooch et al.

[11] 4,224,349
[45] Sep. 23, 1980

[54] MEAT TENDERIZING METHOD

[76] Inventors: Robert C. Gooch, 926 Washington Blvd., Abilene, Tex. 79601; John J. Guenther, 1701 N. Jardot St., Stillwater, Okla. 74074

[21] Appl. No.: 961,851

[22] Filed: Nov. 17, 1978

Related U.S. Application Data

[63] Continuation-in-part of Ser. No. 784,706, Apr. 5, 1977, abandoned.

[51] Int. Cl.² ............................................. A23L 1/31
[52] U.S. Cl. ............................... 426/281; 426/641; 426/652
[58] Field of Search .............. 426/74, 264, 267, 281, 426/332, 641, 644, 645, 647, 648, 649, 652, 804, 806; 423/580, 635, 641

[56] References Cited

U.S. PATENT DOCUMENTS

| Re. 27,981 | 4/1974 | Frank et al. | 426/649 |
|---|---|---|---|
| 203,681 | 5/1878 | Wheat | 426/281 |
| 682,572 | 9/1901 | Schlarb | 426/281 |
| 2,910,369 | 10/1959 | Klein | 426/652 X |
| 2,974,047 | 3/1961 | Holmes | 426/264 |
| 2,999,019 | 9/1961 | Hopkins et al. | 426/641 X |
| 3,003,883 | 10/1961 | Levy | 426/641 X |
| 3,097,952 | 7/1963 | Bresette | 426/649 |
| 3,505,082 | 4/1970 | Miller | 426/649 |
| 3,681,095 | 8/1972 | Inklaar | 426/281 |

FOREIGN PATENT DOCUMENTS

| 683929 | 4/1964 | Canada | 426/281 |
|---|---|---|---|
| 388513 | 3/1933 | United Kingdom | 426/649 |

*Primary Examiner*—Arthur L. Corbin
*Attorney, Agent, or Firm*—Le Blanc, Nolan, Shur & Nies

[57] ABSTRACT

Aqueous solutions containing 2 or more chloride salts, selected from KCl, NaCl, $MgCl_2$ and $CaCl_2$, are injected into meats to enhance tenderness. Concentration of the compounds ranges from 0.3 molar to 2.0 molar when KCl and NaCl are used and from 0.05 molar to 0.6 molar when $MgCl_2$ and $CaCl_2$ are used. Injection amounts range from 2% to 10% of the weight of the meat being treated.

17 Claims, No Drawings

MEAT TENDERIZING METHOD

This application is a continuation-in-part of Ser. No. 784,706, now abandoned.

BACKGROUND OF THE INVENTION

This invention relates to compositions and methods for the tenderization of meat of freshly slaughtered animal carcasses, meat cuts, chilled carcasses or cold meat cuts. More specifically, the invention relates to a meat tenderizing method employing sodium chloride, potassium chloride, magnesium chloride, and calcium chloride, alone or in various mixtures or complexes which are incorporated into the meat tissues to obtain a significant improvement in tenderness. The invention is intended primarily for use with beef, veal, pork, lamb, poultry and other meats used for human consumption.

Of the several sensory characteristics of meat, tenderness is perhaps the trait most highly desired by consumers. Consequently, meat tenderness is a factor of major economic importance to the livestock and meat industries.

Much effort has been expended in attempting to improve the tenderness of meat through the breeding, feeding and management of meat animals. In order to assure tenderness, meat animals are usually fed on high energy or grain diets for extensive periods of time. In response to the world food shortage and hunger situation, it is being suggested presently that more of the grain normally fed to meat animals to enhance tenderness be diverted and fed directly to humans. Thus, if an alternate method of enhancing meat tenderness were made available, extensive feeding of high quality grain to meat animals could be curtailed. In addition, prolonged grain feeding of meat animals to obtain the desired grade and marbling content necessary to enhance tenderness has resulted in a considerable waste of energy and natural resources. Moreover, excessively marbled meat animals tend to deposit excessive waste fat. This practice is costly to the producer, packer, retailer, and ultimately to the consumer. Also, current medical thinking favors limiting the dietary fat intake of humans.

In the past, attempts to directly improve meat tenderness have involved extended holding or "aging" of meat carcasses or cuts under a controlled refrigerated environment. This practice results in considerable expenditures of energy required for refrigeration, large inventories of meat carcasses or cuts in the packers' coolers and desiccation of meat tissues. Also, this procedure encourages microbial growth in meat tissues which could result in spoilage and or trim losses. These factors give rise to carcass or cut losses due to shrinkage, as well as a waste of energy. Obviously, the monetary aspects involved result in higher prices for meat to the consumer.

Other methods for improving tenderness have involved the injection of proteolytic enzymes into meat. These enzymes are derived from plant, microbial or fungal sources and require rigidly controlled conditions so as to neither harm nor overtenderize the meat which results in mushiness, off-odors or off-tastes in the meat. Representative prior art disclosures of such proteolytic enzymes used alone as a meat tenderizing composition include U.S. Pat. No. 2,903,362, issued to Benk and U.S. Pat. No. 2,582,391 issued to Williams. The composition disclosed in the Williams U.S. Pat. No. 3,076,712 includes a wide spectrum antibiotic and proteolytic enzyme while U.S. Pat. No. 3,188,213, issued to Delaney, discloses the use of NaCl with smaller amounts of a non-linear phosphate and a proteolytic enzyme.

The use of phosphates, alone or in combination with other salts, notably NaCl, is disclosed in a number of prior art patents. However, phosphates are not the equivalent of the chloride salts herein disclosed, as is set forth in detail below. Representative teachings are found in U.S. Pat. No. 2,999,019 issued to Hopkins et al; U.S. Pat. No. 3,147,123 issued to Komarik; U.S. Pat. No. 3,207,608 issued to Brown et al.; and U.S. Pat. No. 3,971,854 issued to Hinnergardt. In Hopkins et al, the amount of salt called for is generally higher than herein disclosed whereas in Brown et al., the teaching of the amount of solution injected is far in excess of that disclosed and taught herein. In both patents, the tenderizing effects of NaCl used alone are somewhat discounted.

The extra step of mechanical tenderizing is required in the Hinnergardt disclosure. In several of these patents the use of two sodium compounds is encouraged (e.g., sodium phosphate and sodium chloride) which may result in a product having an unacceptably high sodium content. This becomes a certainty in the case of those who must restrict the amount of sodium intake in their diets.

Other disclosures which discount the effectiveness of a chloride salt as a tenderizing agent include the Williams U.S. Pat. No. 3,006,768, which teaches the injection of plain water as a meat tenderizer and states that salt is not critical to the obtaining of enhanced tenderness in the meat. In an earlier U.S. Pat. No. 2,961,321, Williams teaches that NaCl has no or perhaps questionable tenderizing effect upon meat. In U.S. Pat. No. 3,166,423 issued to Sleeth et al., a tenderizing solution containing a proteolytic enzyme and NaCl is disclosed, but the NaCl is taught as only preventing drip and shrinkage; no tenderizing effect is accorded the NaCl component.

The use of potassium compounds in treating meat is also well known, specifically potassium nitrite and potassium chloride as curing agents, as is disclosed in U.S. Pat. No. 2,688,555 issued to Komarik et al. and U.S. Pat. No. 2,955,042 issued to Firor, respectively. However, the curing concentrations disclosed are generally in excess of the tenderizing amounts disclosed herein.

SUMMARY OF THE INVENTION

Accordingly, it is a principal object of the invention to provide a meat tenderizing composition comprising an aqueous solution of two or more chloride salts, namely KCl, NaCl, $MgCl_2$, and $CaCl_2$ in sufficient but controlled concentrations and amounts to measurably improve the tenderness of the meat without otherwise affecting the meat in any deleterious manner.

An object of the invention is to provide a method of tenderizing meat that would preclude the necessity of resorting to the wasteful practice of extensive grain feeding of meat animals, thereby conserving large amounts of caloric energy which could be diverted to satisfy dire human needs.

Another object of the invention is to provide a method of tenderizing meat that would not require the introduction into meat of tissue hydrolyzing, proteolytic enzymes which might destroy or render unfit for human consumption considerable tonnages of such nutritive meat animal organs as liver, heart, kidneys and tripe.

A further object of the invention is to provide a uniform effective method of tenderizing meat from any meat animal without having to tailor the process according to the animal's age, sex, grade, weight or expected tenderness.

Still another object of this invention is to upgrade and make commercially acceptable block beef, tougher cuts and lower grades of meat such as U.S. utility cows.

Another object of the invention is to provide a method of tenderizing meat whereby the aging of meat becomes unnecessary, thus preventing wasteful losses in energy or in carcass weight due to microbial spoilage, trim losses and desiccation.

Still another object of the invention, is to provide a method of tenderization of meat which is obtained from either freshly slaughtered carcasses or cuts or chilled carcasses or cuts, thus allowing greater flexibility in the handling of carcasses or cuts and premitting rapid or controlled packer inventory turnover.

Another object of the invention is to eliminate the necessity of elaborate technical procedures to control and monitor the preparation of the tendering solution, and further provide a solution that is safe and harmless in case of spills or skin contact in its administration.

Yet another object of the invention is to provide a method of tenderization of meat which eliminates the necessity of any special handling, such as freezing or low temperature holding of the tenderized meat by the packer, retailer or consumer.

Another object of the invention is to provide a method of tenderization of meat which would allow the retailer to process, package and display the tenderized meat in the usual manner for handling fresh meat.

A further object of the invention is to provide a method of tenderization of meat that allows the consumer to handle and cook the tenderized meat in the usual manner, as well as to cook the meat to any desired degree (rare, medium or well done) with less shrinkage and less loss of natural juices.

DESCRIPTION OF THE PREFERRED EMBODIMENTS

We have discovered that the incorporation or injection of various concentrations of aqueous solutions of potassium chloride, sodium chloride, magnesium chloride and calcium chloride, in various combinations as set forth below, into freshly slaughtered meat animal carcasses or meat cuts or chilled carcasses or meat cuts results in a substantial and highly significant increase in tenderness of the meat as measured by the Warner-Bratzler shear test on cooked meat, as well as by taste tests.

Additionally, a number of tests were conducted employing a solution of a selected, individual salt.

The tendering solutions in our invention are prepared simply by dissolving the appropriate amount or weight of potassium chloride, sodium chloride, magnesium chloride or calcium chloride, in water so that the concentration of each of the compounds in the solution is of the molarity desired with respect to the total volume of the solution. Either distilled water or tap water may be used as the solvent. The tendering solutions may be prepared immediately prior to use, or prepared in advance and stored at room temperature or in a refrigerator. Temperature control is not a critical factor and the tendering solutions require no technical monitoring by skilled personnel, as is necessary with some of the tenderizers containing proteolytic enzymes.

The tendering solutions may be introduced or injected into the meat by any suitable means, such as through known multineedle injection devices equipped with multiapertured needles. Injection pressure does not appear to be a critical element, but rather the objective is to obtain a uniform distribution of the tendering mixture in the meat tissue. The tendering solutions are harmless to plant personnel, create no particular meat handling problems for the packers, retailer, or consumer, and are easily controlled as they do not necessarily need to be altered according to the breed, sex, age or grade of the animal from which the meat is obtained, as is usually the case when proteolytic enzymes are used as tenderizers. The tendering solutions may be injected into the meat in varying amounts. We have tested injection amounts ranging from 2 to 10 percent of the weight of the meat to be treated. With the 2 percent injection distribution of the solution occasionally is a problem, although the treatment is effective. Injections over 10% are not readily accepted by current USDA regulations. We prefer to inject about 3 percent of the solution base on the weight of the meat to be injected, and excellent results have been obtained with this procedure.

In our numerous tests, we have varied the concentration of the potassium chloride or the sodium chloride when either was used individually or in combination with other of the aforementioned compounds from about 0.3 molar to about 2.0 molar, while the concentration of the magnesium chloride or the calcium chloride when used individually or in combination with other of the aforementioned compounds was varied from about 0.05 molar to about 0.6 molar. Although the exact mechanism is imperfectly understood, our test results suggest that when magnesium chloride or calcium chloride is combined with potassium chloride or sodium chloride in our tendering solutions, a synergistic effect is attained which lowers the molar concentration required for each ion, particularly the divalent cation to achieve the desired tenderization. It is pointed out that while concentrations of the chemical compounds below the lower limits as stated above produce some tendering effect, the effect is not as dramatic as would seem to be desired by consumers. In addition, concentrations of the chemical compounds higher than the upper limits as stated above resulted in further increases in tenderness, but the tenderness increase produced by these higher limits does not appear to be enough to justify the added costs; moreover, the natural meat flavor tends to be affected by these higher limits.

The above mentioned chloride salts were selected for use in our tenderizing solutions because they are effective, naturally occurring minerals in most biological systems, easily obtained, inexpensive, and apparently do not interfere with any natural tendering effect which may occur in the meat. Rather, they appear to enhance it. Also, they are not simply artificial buffers, such as the phosphates which seem to function more or less by altering the natural pH of meat post-mortem, so that the meat will retain more water, particularly added water. Other chloride salts were not used because of possible toxicity, e.g., lead chloride, or they were too costly, e.g., zinc chloride, or they produced objectionable taste or aroma, e.g., ammonium chloride.

The tendering solutions containing one or more of the above mentioned compounds do not destroy meat tissue or cause the loss of edible organs such as livers, kidneys, hearts, tripe or head meat, nor do they cause over tenderness or mushiness, off odors and off flavors, as may be the case when proteolytic enzymes such as papain or certain enzymes from fungal sources are used as meat tenderizers. In fact, the chemical elements contained in the tenderizing solutions of our invention are considered to be essential electrolytes by members of the medical profession for proper digestion, absorption and metabolism of foodstuffs in humans. Additionally, without losing this effectiveness, the tendering solutions may be varied in selected combinations to accommodate patients who have been prescribed special diets, such as the elimination of table salt to restrict the patients dietary sodium intake. This is not possible with other meat tenderizers such as sodium chloride plus various proteolytic enzyme mixtures or sodium chloride plus sodium phosphate, as the sodium concentration suggested to effect any significant degree of tenderization with these tenderizers is high. In this regard the tendering solutions of our invention may also be varied, without loss of effectiveness, to accommodate patients who may have a need for elevated dietary potassium, thus possibly even precluding the necessity of including high potassium foods in the diet.

The following examples are illustrative of several variations of solutions that may be employed in accordance with the teachings of the invention.

EXAMPLE I

The right and left eye of the round muscles were removed from a freshly slaughtered "D bone" cow carcass. Each of the muscles was divided into two equal sections, dorsal and ventral, giving a total of 4 sections. Using a table of random digits, one of 4 treatments was assigned at random to each of the above muscle sections. Section no. 1, left dorsal, was injected with 3% of its original weight with an aqueous solution containing 0.6 M KCl. Section no. 2, left ventral, was injected with 3% of its original weight with an aqueous solution containing 0.6 M KCl and 0.12 M $MgCl_2$. Section no. 3, right dorsal, was untreated and served as the control. Section no. 4, right ventral, was injected with 3% of its original weight with an aqueous solution containing 0.12 M $MgCl_2$.

All 4 muscle sections were stored at approximately 38° F. for 72 hours. Then, 4 one-inch thick steaks were cut from each section. The steaks were cooked in an oven at 300° F. to a center temperature of 160° F. Five ¾inch cores were removed from each steak and sheared on a Warner-Bratzler shear machine. The average shear value for the 0.6 M KCl injected steaks was 0.5% lower than that of the controls. The average shear value for the 0.12 M $MgCl_2$ injected steaks was 36.2% lower than that of the controls. Thus the decrease in the average shear value of the 0.6 M KCl injected steaks added to that of the 0.12 M $MgCl_2$ injected steaks was 36.7% lower than the average shear value of the controls.

However, the average shear value for the 0.6 M KCl and 0.12 M $MgCl_2$ injected steaks was 45.1% lower than that of the controls. Accordingly, the additive value, 36.7%, when subtracted from the decrease in average shear value with respect to the controls, of the steaks injected with 0.6 M KCl and 0.12 M $MgCl_2$, 45.1%, resulted in a tendering effect which was 8.4% greater than the additive total of the single chloride salt treatments. A demonstrably clear synergistic effect was thus obtained when these two chloride salts were combined into a single injection.

EXAMPLE II

In another test the right and left eye of the round muscles were removed from a freshly slaughtered "D bone" cow carcass. Each of the muscles was divided into two equal sections, dorsal and ventral, giving a total of 4 sections. Using a table of random digits, one of 4 treatments was assigned at random to each of the above muscle sections. Section no. 1, left dorsal, was injected with 3% of its original weight with an aqueous solution containing 0.12 M $MgCl_2$. Section no. 2, left ventral, was injected with 3% of its original weight with an aqueous solution containing 0.6 M KCl and 0.12 M $MgCl_2$. Section no. 3, right dorsal, was untreated and served as the control. Section no. 4, right ventral, was injected with 3% of its original weight with an aqueous solution containing 0.6 M KCl.

All 4 muscle sections were stored at approximately 38° F. for 72 hours. Then, 4 one-inch thick steaks were cut from each section. The steaks were cooked in an oven at 300° F. to a center temperature of 160° F. Five ¾inch cores were removed from each steak and sheared on a Warner-Bratzler shear machine. The average shear value for the 0.6 M KCl injected steaks was 0.3% lower than that of the controls. The average shear value for the 0.12 M $MgCl_2$ injected steaks was 26.6% lower than that of the controls. Thus the decrease in the average shear value of the 0.6 M KCl injected steaks added to that of the 0.12 M $MgCl_2$ injected steaks was 26.9% lower than the average shear value of the controls.

However, the average shear value for the 0.6 M KCl and 0.12 M$MgCl_2$ injected steaks was 46.9% lower than that of the controls. Accordingly, the additive value, 26.9%, when subtracted from the decrease in average shear value with respect to the controls, of the steaks injected with 0.6 M KCl and 0.12 M $MgCl_2$, 46.9%, resulted in a tendering effect which was 20.0% greater than the additive total of the single chloride salt treatments. Another demonstrably clear synergistic effect was thus obtained when the two chloride salts were combined into a single injection.

EXAMPLE III

In another test the right and left strip loin muscles were removed from a "D bone" cow carcass that had been chilled for 48 hours prior to removal of the muscles. Each of the muscles was divided into two equal sections, anterior and posterior, giving a total of 4 sections. Using a table of random digits, one of 4 treatments was assigned at random to each of the above muscle sections. Section no. 1, left anterior, was injected with 3% of its original weight with an aqueous solution containing 0.12 M $MgCl_2$. Section no. 2, left posterior, was injected with 3% of its original weight with an aqueous solution containing 0.6 M KCl and 0.12 M $MgCl_2$. Section no. 3, right anterior, was untreated and served as the control. Section no. 4, right posterior, was injected with 3% of its original weight with an aqueous solution containing 0.6 M KCl.

All 4 muscle sections were stored at approximately 38° F. for 72 hours. Then, 5 one-inch thick steaks were cut from each section. The steaks were cooked in an oven at 300° F. to a center temperature of 160° F. Five ¾ inch cores were removed from each steak and sheared on a Warner-Bratzler shear machine. The average shear value for the 0.6 M KCl injected steaks was 1.0% lower than that of the controls. The average shear value for the 0.12 M $MgCl_2$ injected steaks was 25.2% lower than that of the controls. Thus the decrease in the average shear value of the 0.6 M KCl injected steaks added to that of the 0.12 M MgCl$_2$ injected steaks was 26.2% lower than the average shear value of the controls.

However, the average shear value for the 0.6 M KCl and 0.12 M MgCl$_2$ injected steaks was 46.1% lower than that of the controls. Accordingly, the additive value, 26.2%, when subtracted from the decrease in avereage shear value with respect to the controls, of the steaks injected with 0.6 M KCl and 0.12 M MgCl$_2$, 46.1%, resulted in a tendering effect which was 19.9% greater than the additive total of the single chloride salt treatments. Yet another demonstrably clear synergistic effect was thus obtained when the two chloride salts were combined into a single injection.

EXAMPLE IV

In another test the right and left strip loin muscles were removed from a "D bone" cow carcass that had been chilled 48 hours prior to removal of the muscles. Each of the muscles was divided into two equal sections, anterior and posterior, giving a total of 4 sections. Using a table of random digits, one of 4 treatments was assigned at random to each of the above muscle sections. Section no. 1, left anterior, was injected with 3% of its original weight with an aqueous solution containing 0.6 M KCl. Section no. 2, left posterior, was injected with 3% of its original weight with an aqueous solution containing 0.6 M KCl and 0.12 M MgCl$_2$. Section no. 3, right anterior, was untreated and served as the control. Section no. 4, right posterior, was injected with 3% of its original weight with an aqueous solution containing 0.12 M MgCl$_2$.

All 4 muscle sections were stored at approximately 38° F. for 72 hours. Then, 5 one-inch thick steaks were cut from each section. The steaks were cooked in an oven at 300° F. to a center temperature of 160° F. Five ¾ inch cores were removed from each steak and sheared on a Warner-Bratzler shear machine. The average shear value for the 0.6 M KCl injected steaks was 4.4% lower than that of the controls. The average shear value for the 0.12 M MgCl$_2$ injected steaks was 3.3% higher than that of the controls. Thus, the net change in the average shear value of the 0.6 M KCl injected steaks added to that of the 0.12 M MgCl$_2$ injected steaks was 1.1% lower than the average shear value of the controls.

However, the average shear value for the 0.6 M KCl and 0.12 M MgCl$_2$ injected steaks was 46.8 % lower than that of the controls. Accordingly, the additive value, 1.1%, when subtracted from the decrease in average shear value with respect to the controls, of the steaks injected with 0.6 M KCl and 0.12 M MgCl$_2$, 46.8%, resulted in a tendering effect which was 45.7% greater than the total of the single chloride salt treatments. Still another demonstrably clear synergistic effect was thus obtained when the two chloride salts were combined into a single injection.

EXAMPLE V

The right and left boneless strip loins and eye of the round muscles were removed from a freshly slaughtered choice grade steer. The muscles from the right side were injected with 3% of their original weight of an aqueous solution containing 0.6 M KCl and 0.12 M MgCl$_2$. The left side muscles were untreated and served as the controls. All four muscles were stored in a cooler at 36° F.–38° F. for 80 hours. Upon removal from the cooler, five one-inch thick steaks were cut from each muscle and cooked in an oven at 300° F. to a center temperature of 160° F. Five ¾ inch cores were removed from each of the treated and control steaks and sheared on a Warner-Bratzler shear machine. The shear values for the treated strip loin and eye of round steaks averaged 69.1% and 38.7% lower than the untreated controls, respectively, thus indicating a highly significant tendering effect of the test solution.

EXAMPLE VI

The right and left boneless strip loins and the eye of the round muscles were removed from a freshly slaughtered commercial cow. The muscles from the right side were injected with 3% of their original weight of an aqueous solution containing 0.6 M KCl and 0.12 M MgCl$_2$. The left side muscles were untreated. After cooler storage at 36° F.–38° F. for 72 hours, five one-inch thick steaks were cut from each muscle and cooked in an oven at 300° F. to a center temperature of 160° F. Five ¾ inch cores were removed from each steak and sheared on a Warner-Bratzler shear machine. The average shear values for the treated strip loin and eye of round steaks were 60.2% and 53%, lower than the shear values of the untreated controls, respectively. Again, these results showed a highly significant effect for the test solution.

EXAMPLE VII

Another test was conducted with cow muscles as described in Example VI, except that the injection solution contained 1.99 M KCl and 0.39 M MgCl$_2$. Results showed that the treated strip loin and eye of round steaks averaged 76% and 70.6% lower in shear value than the untreated controls, respectively.

EXAMPLE VIII

The right and left boneless strip loins and eye of the round muscles were removed from a commercial grade cow carcass that had been chilled seven days at 36° F.–38° F. prior to the removal of the muscles. The right side muscles were injected with 3% of their chilled weight of an aqueous solution of 0.6 M KCl and 0.12 M MgCl$_2$ while the left side muscles were untreated and served as the controls. After injection, the muscles were held for 72 hours at 36° F.–38° F. Subsequently, five one-inch thick boneless strip steaks and five eye of the round steaks were cut from the treated and control muscles. All steaks were cooked in a 300° F. oven to a center temperature of 160° F. Five ¾ inch cores were taken from each steak and sheared on the Warner-Bratzler hear machine. The averages of the 25 shear values (50 total shears for both muscles) for the treated boneless strip and eye of round steaks were 50.3% and 48.3% lower than their corresponding controls, respectively, thus indicating a highly significant effect for the test solution.

EXAMPLE IX

The right and left prime ribs were removed from two freshly slaughtered commercial cows and placed in a cooler at 36° F.–38° F. for 48 hours, at which time the right side prime ribs were injected with 3% of their weight of an aqueous solution containing 1.99 M KCl and 0.39 M MgCl$_2$. The left ribs were untreated and served as the controls. After an additional cooler storage period of 72 hours, five one-inch thick steaks were cut from each prime rib. The steaks were cooked in an oven at 300° F. to a center temperature of 160° F. Five ⅜ inch cores were removed from each of the treated and control steaks and sheared on a Warner-Bratzler shear machine. The average shear value for the treated steaks (a total of 50 shears) was 43.8% lower than that of the untreated controls, reflecting a highly significant tendering affect of the test solutions.

EXAMPLE X

The right and left boneless strip loins were removed from a freshly slaughtered bull. The right side strip loin was injected with 3% of its weight of an aqueous solution containing 0.5 M KCl and 0.5 M NaCl. The left strip loin was untreated. The loins were stored for 90 hours at 36° F.–38° F. Then five one-inch thick steaks were cut from each loin and cooked in an oven at 300° F. to a center temperature of 160°0 F. Five ¾ inch cores were taken from each steak and sheared on a Warner-Bratzler shear machine. The treated steaks averaged 31.5% lower in shear value than did the untreated controls.

EXAMPLE XI

Another test was conducted with bull strip loin muscles as described in Example X, except that the injection solution contained 0.6 M KCl, 0.5 M NaCl and 0.1 M $MgCl_2$. Results showed that the treated strip loin steaks averaged 31% lower in shear value than the untreated control steaks.

EXAMPLE XII

The right and left boneless strip loins were removed from a freshly slaughtered commercial cow. The right side strip loin was injected with 3% of its weight of an aqueous solution containing 0.6 M KCl. The left strip loin was untreated. The loin muscles were stored for 80 hours at 36° F.–38° F., then treated as described in Example X. The shear values for the treated strip steaks averaged 36.9% less than those of the untreated controls.

EXAMPLE XIII

The right and left boneless strip loin muscles were removed from a freshly slaughtered commercial cow. The right strip loin was injected with 3% of its weight of an aqueous solution containing 0.6 M NaCl. The left strip loins were untreated and served as the controls. The loin muscles were stored for 72 hours at 36° F.–38° F., then tested as described in Example X. Results showed that the shear values averaged 25.4% lower than those of the controls.

EXAMPLE XIV

In another test with boneless strip loins taken from a freshly slaughtered bull, the right strip loins were injected with 3% of their original weight of an aqueous solution containing 0.6 M $CaCl_2$. The right and left loins were stored 48 hours at 36° F.–38° F., then cooked and sheared as outlined in Example X. The shear values for the treated strip steaks were 21.6% lower than those of the controls.

EXAMPLE XV

In another test involving the use of boneless strip loins removed from a freshly slaughtered bull, the right strip loins were injected with 3% of their weight of an aqueous solution containing 0.6 M $MgCl_2$, while the left strip loins were used as the untreated controls. The test was carried out as described in Example X. Results revealed that the treated strip steaks were 23% lower in their average shear value than the untreated controls.

EXAMPLE XVI

In another test with boneless strip loins taken from a freshly slaughtered bull, the right strip loins were injected with 3% of their weight of an aqueous solution containing 0.6 M KCl and 0.1 M $CaCl_2$. The left strip loins served as the controls and the test was conducted as described in Example X. The average shear value for the treated steaks was 27% lower than that of the control steaks.

EXAMPLE XVII

In still another test with boneless strip loins of a freshly slaughtered bull, the right loins were injected with 3% of their weight of an aqueous solution containing 0.6 M KCl, 0.6 M NaCl, 0.1 M $CaCl_2$ and 0.1 M $MgCl_2$. Again, the left loins were used as the controls and the test was carried out as in Example X. The average shear results favored the treated steaks by 26.6% over the untreated controls.

EXAMPLE XVIII

The loins of a freshly slaughtered U.S. #1 barrow were removed and the right center portion of the loin was injected with 3% of its original weight of an aqueous solution containing 0.6 M KCl and 0.12 M $MgCl_2$. The left center portion of the loin served as the untreated control. The remainder of the test was conducted as in Example X, with the exception that the pork loin chops were cut 1¼ inches thick. The average of the 25 shear values for the treated chops was 38% lower than that of the controls, thus indicating a highly significant tendering effect of the test solution on pork.

EXAMPLE XIX

The right and left boneless strip loins and eye of the round muscles were removed from a freshly slaughtered commercial grade cow. The muscles from the right side were injected with 2% of their original weight of an aqueous solution containing 0.6 M KCL and 0.12 M $MgCl_2$. The left side muscles were untreated and served as the controls. All four muscles were stored in a cooler at 36° F.–38° F. for 48 hours. Upon removal from the cooler, five 1-inch thick steaks were cut from each muscle and cooked at 300° F. to a center temperature of 160° F. Five ¾ inch cores were removed from each of the steaks and sheared on a Warner-Bratzler shear machine. Shear values for the injected strip loin and eye of the round steaks averaged 39.1% and 27.9% lower than the untreated controls, respectively.

EXAMPLE XX

Another test was conducted on commercial cow strip loin and eye of the round muscles using the same conditions as described in Example XIX, except that the treated muscles were injected with 10% of their original weight. Results from this test showed that the treated strip loin and eye of the round steaks averaged 70.2% and 40.5% lower in shear value than the control steaks, respectively.

EXAMPLE XXI

Twenty-four 1 inch thick top butt steaks were cut from the right top sirloin butts of three U.S. Good grade steers. An additional twenty-four steaks were cut from the left butts of the same steers. The right butts had been injected with an aqueous solution containing 0.6 M KCl and 0.12 M MgCl$_2$ in the amount of 3% of their original weight. The left butts were uninjected. The forty-eight steaks were placed in a retail display case and the color of the steaks was visually evaluated every four hours for twenty-four hours; then at thirty-six and at forty-eight hours. No difference was noted in visual appearance or color between the treated and control steaks.

EXAMPLE XXII

The boneless strip loins of a commercial cow were removed and injected with an aqueous solution containing 1.99 M KCl and 0.39 M MgCl$_2$. The loins were injected with 3% of their original weight, then placed in a cooler at 36° F.–38° F. for 72 hours. Subsequently, the strip loins were cut into 1 inch thick steaks and cooked in a 300° F. oven to a center temperature of 160° F. A panel of six judges evaluated the steaks as highly acceptable and no salty taste was detected.

EXAMPLE XXIII

Boneless strip loins and eye of the round muscles were removed from three freshly slaughtered commercial cows. The muscles from the right side were injected with 3% of their original weight of an aqueous solution containing 0.6 M KCl and 0.12 M MgCl$_2$; while the muscles from the left side served as the untreated controls. All muscles were stored 72 hours at 36° F.–38° F. Five 1 inch thick steaks were then cut from each muscle and cooked in a 300° F. oven to a center temperature of 160° F. Upon attaining final temperature, each steak was removed from the oven and weighed. Also, the elapsed cooking time was recorded for each steak. Results showed that the treated steaks required about 16% less cooking time than the untreated controls. In addition, the treated strip steaks and eye of the round steaks averaged 36% and 30% less total cooking loss than their corresponding controls. These two factors, cooking rate and cooking loss are of significant importance to the consumer.

In the preceding examples, we have described the effect of specific compositions of our tendering solutions. It is apparent from the results reported above that most of the various compounds and/or all of the combinations of compounds have a favorable effect on meat tenderness. Overall, we have found that our most effective tendering solution consists of about 2.0 molar KCl and 0.4 molar MgCl$_2$. The next most consistently effective solution consists of about 0.6 molar KCl and 0.12 molar MgCl$_2$. However, it should be obvious to those skilled in the art that the exact composition of the tendering solutions may be varied without departing from the essence of our invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A post-mortem method for tenderizing meat from freshly slaughtered or chilled animals comprising injecting into the meat in an amount of about 2 to 10 percent based on the weight of the meat, an aqueous tenderizing composition consisting essentially of water and two or more salts selected from the group consisting of potassium chloride, sodium chloride, magnesium chloride and calcium chloride, the concentration of potassium chloride or sodium chloride being from about 0.3 molar to about 2.0 molar and the concentration of magnesium chloride or calcium chloride being from about 0.05 molar to about 0.8 molar.

2. The method as claimed in claim 1 in which an amount of solution equal to about 3 percent of the weight of the meat being treated is injected into the meat.

3. The method as claimed in claim 1 in which the injection solution contains sodium chloride in a concentration of about 0.3 molar to about 2.0 molar.

4. The method as claimed in claim 1 in which the injection solution contains potassium chloride in a concentration of about 0.3 molar to about 2.0 molar.

5. The method as claimed in claim 1 in which the injection solution contains magnesium chloride in a concentration of about 0.05 molar to about 0.6 molar.

6. The method as claimed in claim 1 in which the injection solution contains calcium chloride in a concentration of about 0.05 molar to about 0.6 molar.

7. The method as claimed in claim 1 in which the injection solution contains potassium chloride and sodium chloride in a concentration of about 0.3 molar to about 2.0 molar with respect to potassium chloride and a concentration of about 0.3 molar to about 2.0 molar with respect to sodium chloride.

8. The method as claimed in claim 1 in which the injection solution contains potassium chloride and magnesium chloride in a concentration of about 0.3 molar to about 2.0 molar with respect to potassium chloride and a concentration of about 0.05 molar to about 0.6 molar with respect to magnesium chloride.

9. The method as claimed in claim 1 in which the injection solution contains potassium chloride and calcium chloride in a concentration of about 0.3 molar to about 2.0 molar with respect to potassium chloride and a concentration of about 0.05 molar to about 0.6 molar with respect to calcium chloride.

10. The method as claimed in claim 1 in which the injection solution contains sodium chloride and magnesium chloride in a concentration of about 0.3 molar to about 2.0 molar with respect to sodium chloride and a concentration of about 0.05 molar to about 0.6 molar with respect to magnesium chloride.

11. The method as claimed in claim 1 in which the injection solution contains sodium chloride and calcium chloride in a concentration of about 0.3 molar to about 2.0 molar with respect to sodium chloride and a concentration of about 0.05 molar to about 0.6 molar with respect to calcium chloride.

12. The method as claimed in claim 1 in which the injection solution contains magnesium chloride and calcium chloride in a concentration of about 0.05 molar to about 0.6 molar with respect to magnesium chloride and in a concentration of about 0.05 molar to about 0.6 molar with respect to calcium chloride.

13. The method as claimed in claim 1 in which the injection solution contains potassium chloride, sodium chloride and magnesium chloride in a concentration of about 0.3 molar to about 2.0 molar with respect to potassium chloride, in a concentration of about 0.3 molar to about 2.0 molar with respect to sodium chloride and in a concentration of about 0.05 molar to about 0.6 molar with respect to magnesium chloride.

14. The method as claimed in claim 1 in which the injection solution contains potassium chloride, sodium chloride and calcium chloride in a concentration of about 0.3 molar to about 2.0 molar with respect to potassium chloride, in a concentration of about 0.3 molar to about 2.0 molar with respect to sodium chloride and in a concentration of about 0.05 molar to about 0.6 molar with respect to calcium chloride.

15. The method as claimed in claim 1 in which the injection solution contains sodium chloride, magnesium chloride and calcium chloride in a concentration of about 0.3 molar to about 2.0 molar with respect to sodium chloride, in a concentration of about 0.05 molar to about 0.6 molar with respect to magnesium chloride and in a concentration of about 0.05 molar to about 0.6 molar with respect to calcium chloride.

16. The method as claimed in claim 1 in which the injection solution contains potassium chloride, magnesium chloride and calcium chloride in a concentration of about 0.3 molar to about 2.0 molar with respect to potassium chloride, in a concentration of about 0.05 molar to about 0.6 molar with respect to magnesium chloride and in a concentration of about 0.05 molar to about 0.6 molar with respect to calcium chloride.

17. The method as claimed in claim 1 in which the injection solution contains potassium chloride, sodium chloride, magnesium chloride and calcium chloride in a concentration of about 0.3 molar to about 2.0 molar with respect to potassium chloride and sodium chloride and in a concentration of about 0.05 molar to about 0.6 molar with respect to magnesium chloride and calcium chloride.

* * * * *